United States Patent
Ritter

(10) Patent No.: US 7,244,358 B2
(45) Date of Patent: Jul. 17, 2007

(54) DENITRIFICATION OF AQUARIUM WATER

(75) Inventor: Günter Ritter, Bünde (DE)

(73) Assignee: Tetra GmbH, Melle (DE)

( * ) Notice: Subject to any disclaimer, the term of this patent is extended or adjusted under 35 U.S.C. 154(b) by 90 days.

(21) Appl. No.: 10/475,482

(22) PCT Filed: Apr. 24, 2002

(86) PCT No.: PCT/EP02/04478

§ 371 (c)(1),
(2), (4) Date: May 7, 2004

(87) PCT Pub. No.: WO02/094015

PCT Pub. Date: Nov. 28, 2002

(65) Prior Publication Data

US 2004/0206696 A1 Oct. 21, 2004

(30) Foreign Application Priority Data

Apr. 26, 2001 (DE) .................... 101 20 421

(51) Int. Cl.
    *C02F 3/00* (2006.01)
(52) U.S. Cl. ............ 210/610; 210/615; 210/617; 210/616; 210/620
(58) Field of Classification Search ............ 210/610, 210/615, 616, 617, 620
    See application file for complete search history.

(56) References Cited

U.S. PATENT DOCUMENTS

| | | | | |
|---|---|---|---|---|
| 4,265,751 A | * | 5/1981 | Willinger | .................... 210/169 |
| 5,316,832 A | * | 5/1994 | Groten et al. | ................ 442/401 |

FOREIGN PATENT DOCUMENTS

| | | |
|---|---|---|
| DE | 35 16 617 | 11/1986 |
| DE | 198 13 022 | 9/1999 |
| JP | 10-165177 | 6/1998 |
| JP | 10-165733 | 6/1998 |

OTHER PUBLICATIONS

A. Boley, W.R. Muller, G. Haider: "Biodegradable polymers as solid substrate and biofilm carrier for denitrification in recirculated aquacultrure systems" Aquacultral Engineering, Bd. 22, (2000) 75-85, SP002217355, Elsevier Science B.V.

* cited by examiner

*Primary Examiner*—Chester T. Barry
(74) *Attorney, Agent, or Firm*—Merchant & Gould

(57) ABSTRACT

The invention relates to agents for the removal or reduction of inorganic nitrogen compounds, especially nitrate, from biological aquarium waters, containing a biologically degradable polymer, preferably polycaprolactone (PCL) and to the utilization of said agents.

11 Claims, 2 Drawing Sheets

DENITRIFICATION OF AQUARIUM WATER

The invention relates to agents for the removal or reduction of inorganic nitrogen compounds, in particular nitrate, from biological container waters containing a biologically degradable polymer, preferably polycaprolactone (PCL) and to the use of these agents.

The daily feeding of fish and other water organisms causes a regular introduction of organic nitrogen compounds in aquarium systems.

In the primarily aerobically operating filtering systems, the introduced or eliminated organic nitrogen compounds are degraded to form nitrate by the intermediary steps ammonia/ammonium and nitrite whose concentration remains low.

Since the denitrification activity is considerably lower in most cases than the nitrification activity in the aquarium systems, this results in a continuous increase in the nitrate concentration.

Although the nitrate anion is only very slightly toxic for fish, endeavours are nevertheless made to slow down the increase in nitrate or to keep the nitrate concentration low.

In addition to ion exchange processes for reducing the nitrate which, however, produce secondary undesirable effects, the process of denitrification is used. The denitrification is associated with largely anaerobic conditions and the presence of degradable carbon compounds.

Since the formation of nitrate by nitrification occurs almost continuously, it is expedient to also allow the denitrification to take place more or less continuously. The amount of nitrate being added daily in only a low concentration also makes it possible to omit large substance conversions during denitrification. Therefore, difficult to dissolve organic, biologically degradable polymers are very well suited as slowly reacting C sources.

To date, the following processes are known which use the BDPs (biologically degradable polymers):

a) Granulated material and molded/shaped parts consisting of polyhydroxybutyrates (PHB) which are placed in the ground on the bottom of the aquariums to create anaerobic degradation conditions. PHB is built up by special bacterial species as an energy reserve substance and embedded in the cells. Therefore, as natural material, it is easily degradable. Other BDPs were not used in aquarium systems.

b) Boley, Müller et al. placed granulated PHB and polycaprolactone (PCL) in special anaerobic reactors under strict anaerobic reaction conditions which only have a very small flow (0.3-0.5 l/h) for the $O_2$ limiting to degrade nitrate. The amounts of granulated material used were about 280-380 g per 100 l, i.e. they were very high.

Figure 1:
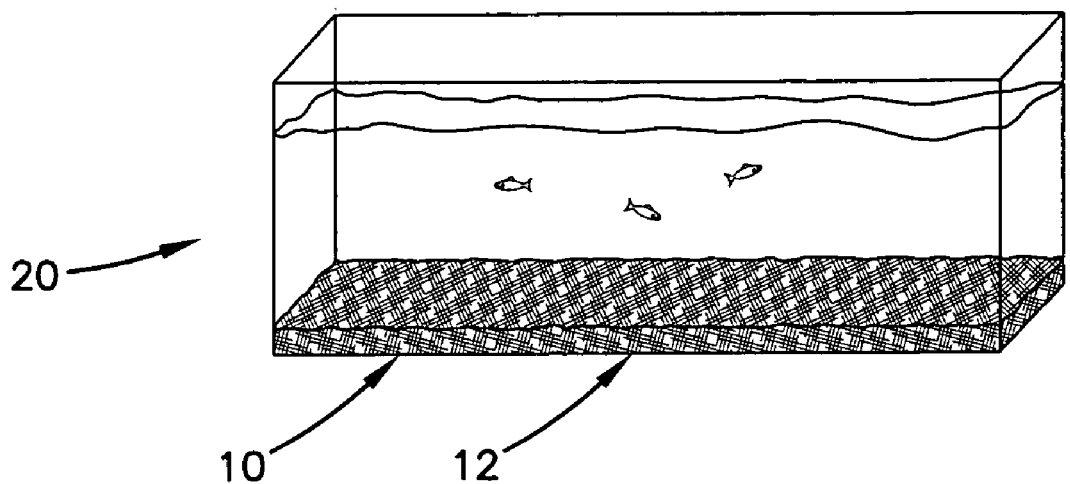
FIG. 1 is a schematic representation of an aquarium system utilizing one embodiment of the invention in accordance with the principles disclosed.

In comparison to the prior art, the agents, materials or processes according to the invention offer considerable advantages and/or also surprising functional and mechanical improvements for a person skilled in the field.

In comparison to the described prior art, the use of granulated material consisting of polycaprolactone (PCL) offers the following serious advantages:

Considerably better industrial availability, since there is no mass producer for PHB at this time.

Substantial cost advantages, since PHB is about 2 to 3.5 times more expensive than PCL.

In addition, it was surprisingly found that PCL as a synthetic-chemically produced material is similarly easily degradable as PHB.

PCL exhibits a surprisingly different degradation behaviour compared to PHB when nitrate is removed in that it already results in a completely sufficient nitrate reduction under non-anaerobic or even under aerobic conditions for aquarium conditions.

When using PCL granulated material, it was surprisingly shown that it was just under aerobic operating conditions that a quicker, more effective nitrate reduction is obtained than under anaerobic conditions. This fact is surprising and could not be expected with conventional BDPs according to the prior art.

Although it is already known according to the prior art to mix granulated material and molded bodies consisting of PHB with the bottom layer of aquariums for a reduction in nitrates, the use of PCL granulated material in the bottom layer of aquarium systems was not carried out to date.

From known or compiled results from experiments with PHB granulated material, a reaction behaviour similar for PCL (as BDP) was expected, namely a) the degradation of nitrate by denitrification under preferably anaerobic conditions in the bottom, b) an increase, promotion of the denitrification with the creation of largely anaerobic conditions.

However, surprisingly, it was found that PCL in the bottom degrades nitrate all the more effectively the more coarse-grained the bottom layer is made.

In a comparative test, 70 g PCL granulated material (round to oval balls, diameter of about 4 mm, content >99% polycaprolactone) per 100 l aquarium water were mixed in aquariums with 10 to 20 l bottom matter consisting of a) sand (<1 mm)

b) fine gravel (ø 1-2 mm)

c) medium coarse gravel (ø 2-3 mm)

and the increase in nitrate of the aquarium occupied by fish and fed daily was measured over a period of 3 months.

An Aquarium Not Treated with PCL was Used as a Comparison.

The following gradation of the test results according to the prior art was suprising and an opposite trend would have been expected:

a) Sand (ø 1 mm)

The nitrate content increased in the control aquarium in the test period from 49 mg/l to 128 mg/l; only a low decrease in nitrates was found in the aquarium treated with PCL. The nitrate increased from 49 mg/l to 109 mg/l.

b) Fine gravel (ø 1-2 mm)

The nitrate degradation was considerably more intense. The nitrate concentration increased from 49 mg/l at the start to 74 mg/l, in the control test to 135 mg/l.

c) Medium coarse gravel (ø 2-3 mm)
   In this case, the nitrate reduction was even more clearly pronounced:
   From 49 mg/l at the start, a decrease in nitrate to only 40 mg/l could even be seen; in the control test, an increase to 136 mg/l.

A further experiment with gravel having a particle size of 3-5 mm resulted in a nitrate increase of 18 mg/l at the start to 33 mg/l after 3 months, while the control exhibited the following nitrate concentrations: 18 mg/l to 104 mg/l. The resultant nitrate concentration was still under the value for medium coarse gravel (ø 2-3 mm).

In contrast to the control aquariums not treated in which the nitrate content increased further, the nitrate content remained constant in the PCL-treated aquariums after about 2-3 months, at a level dependent on the PCL dosage.

If PCL granulated material of about 4 mm in diameter are mixed in fine (ø 1-2 mm), even better in medium coarse (ø 2-3 mm) or even coarse gravel (ø 3-5 mm), the following nitrate concentrations set in in the treated aquariums, dependent on the bottom layer mixture, with various PCL dosages in the period of 3 months:

1) Various types of bottom mixtures, PCL dosage: 70 g/100 l water:
   a) sand (ø<1 mm)—increase from 49 to 109 mg/l $NO_3$
   b) fine gravel (ø 1-2 mm) increase from 49 to 74 mg/l $NO_3$
   c) medium coarse gravel (ø 2-3 mm)—constant until decline in the range 47 over 27 to 40 mg/l $NO_3^-$
   d) coarse gravel (ø 3-5 mm)—increase from 18 to 33 mg/l $NO_3^-$ 2. Coarse gravel (ø 3-5 mm) with various PCL dosages after 3 months:
   a) 0 g/100 l PCL: increase from 18 mg/l to 104 mg/l $NO_3^-$
   b) 25 g/100 l PCL: increase from 18 mg/l to 86 mg/l $NO_3^-$
   c) 50 g/100 l PCL: increase from 18 mg/l to 60 mg/l $NO_3^-$
   d) 100 g/100 l PCL: reduction from 18 mg/l to 8 mg/l $NO_3^-$ Referring to FIG. 1, the process according to the invention for nitrate limiting, control and reduction by mixing PCL granulated material 10 with fine to coarse gravel 12 can be carried out very easily by simply mixing the PCL granulated material in the bottom mixture of the aquarium system 20.

The application only has to be repeated every 6-12 months. It acts advantageously on the water quality, that anaerobic conditions in the coarse-grained bottom layer mixture that is thoroughly flowed through by water are not required and are also not produced by the process. As a result, anaerobic decomposition processes and the $H_2S$ release by sulfate reduction can be avoided.

The growth of the water plants rooting in the bottom layer mixture is not negatively affected by this, but even clearly promoted.

The following dosages of PCL granulated material (ø about 4 mm) have shown to be advantageous for mixing in fine to coarse gravel, namely 20 g/100 l water to 200 g/100 l water, preferably 60-120 g/100 l water.

Figure 2:
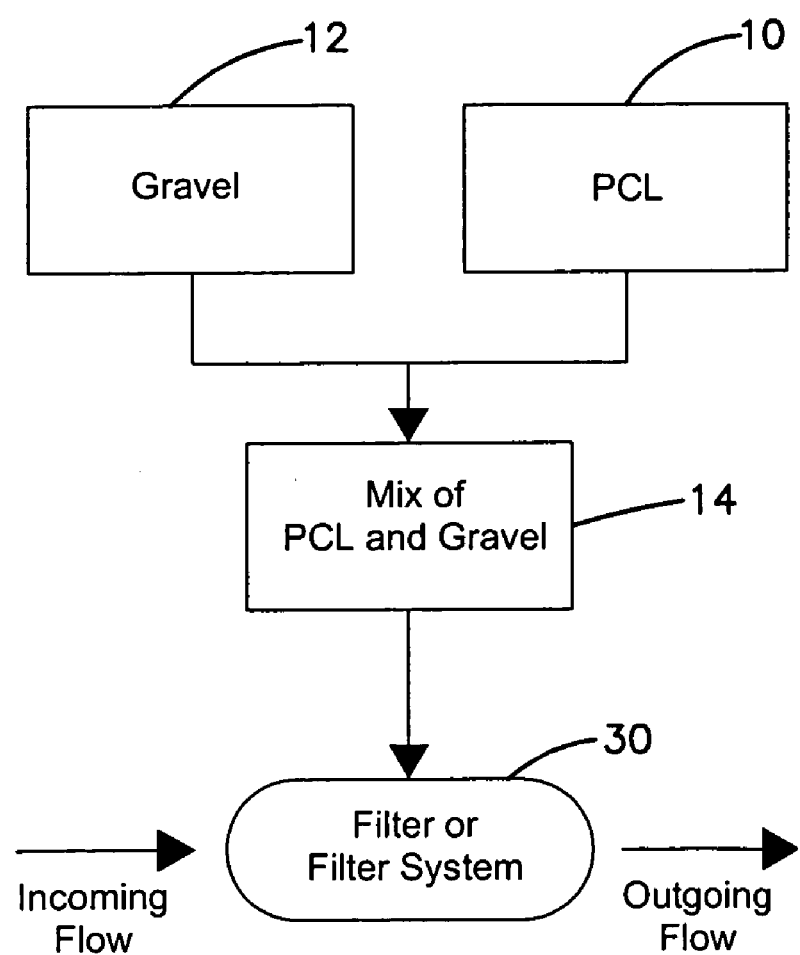
FIG. 2 is a diagrammatic representation of another embodiment of the invention in accordance with the principles disclosed.

Referring to FIG 2, since PCL 10 is not dependent on anaerobic reaction conditions, the use of PCL granulated material in aerobic filtering systems 30 is also possible.

According to the aforementioned prior art, PCL granulated material were used in the mixture with PHB granulated material in anaerobic reactors operating in the secondary flow with a very small flow (0.3-0.5 l/h) and high dosage (280-380 g/100 l) for the anaerobic nitrate degradation.

It was therefore highly surprising and, according to the prior art, completely unexpected that PCL granulated material (ø about 4 mm) can also be used advantageously under aerobic conditions, i.e. in filtering chambers or filtering units in the main stream (with $O_2$ saturated water) at high flow rates of 20-500 l/h to lower nitrate and even ammonium and nitrite in aquarium systems.

However, the use of PCL granulated material as sole filtering medium in the filter chamber of an inner filter was shown to be unsuitable, since a considerable decrease of the flow rate could already be ascertained after about 2 to 4 weeks, so that a filtering function was no longer given. The cause was the formation of slime about the granular particles which ultimately resulted in the formation of an almost water-impermeable, agglutinated filter filling consisting of slime-coalesced PCL.

Although nitrate was removed from the aquarium water at the beginning by the application described above, it was only as long as the filter still showed a flow, i.e. after about 2 to 4 weeks, the nitrate removal also ceased for the aforementioned reasons.

However, if the PCL granulated material 10 (FIG. 2) are diluted by an addition of 25-75% by volume of gravel 12, preferably having a particle size of 2-5 mm, and mixing it thoroughly, a filter material 14 is obtained which no longer exhibits the functional problems appearing with pure PCL granulated material. The filtering chamber of an inner filter was filed with a 50:50 mixture and the long-term behavior observed. The filtering effect and the nitrate degradation remained problem-free over a period of months.

The described PCL/gravel mixture 14 should also be suitable for filling other filtering systems 30 as a filtering material, e.g. outer filter, inner filter with filter chambers, pot filter systems, etc. Advantages of these filtering mixtures are:
   no agglutination by binding slime
   double filtering effect, namely normal biological filtering plus nitrate degradation
   simple exchange when the nitrate degradation is exhausted.

Instead of gravel, any other commercial filter granulated material consisting of natural substances such as pumice, sandstone, basalt, etc. or of synthetic materials can, of course, also be used as dilutant for PCL granulated material in filtering chambers.

Figure 3:
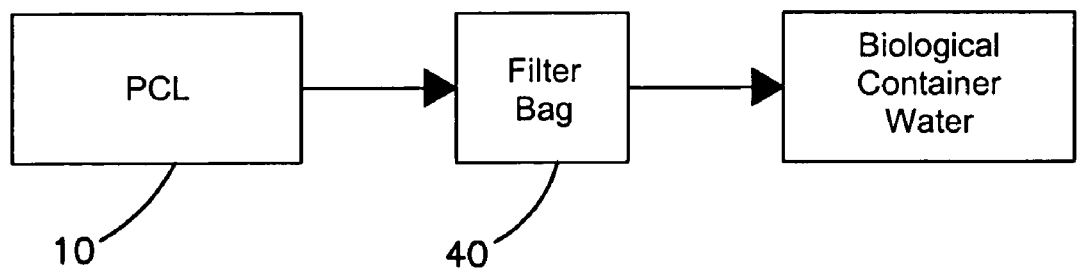
FIG. 3 is a diagrammatic representation of yet another embodiment of the invention in accordance with the principles disclosed.

The aforementioned problems when using pure PCL granulated material were also not found when using PCL granulated material in fleece filter bags 40 (FIG. 3). In this case, the filter bags were only partially filled with about 20-60% of the overall volume and renewed every 4 weeks. Since it is very easy to exchange such filter bags and only a small fraction of the PCL granulated material is degraded in 4 weeks, the PCL dosage is kept almost constant and thus also the rate of dosage-dependent nitrate reduction.

The dosages of the PCL granulated material in the application of the invention are considerably less than according to the prior art.

Even 20-40 g/100 l, 35 g/100 l in the experiment, are already sufficient to limit the increase in nitrate to 50-60 mg/l. Higher dosages (up to 100 g/100 l) are still considerably more efficient.

In addition to nitrate, ammonium and nitrite are also effectively removed from the aquarium system in this case.

When using 100-250 g PCL/100 l, existing ammonium and nitrite concentrations were reduced to almost 0 mg/l within 0.5 to 1.0 weeks.

To reduce the nitrate concentration, the following experiments were performed:

PCL granulated material were inserted in various dosages in water-permeable fleece bags in the main filter flow. The water flow was 30-1000 l/h, preferably 50-500 l/h.

35 g, 70 g and 105 g PCL were filled into the fleece bags per 100 l.

During the test time of 3 months, the following nitrate concentrations appeared:
- a) control (0 g/100 l PCL)—increase in nitrate from 26 mg/l to 175 mg/l,
- b) 35 g/100 l PCL—increase in nitrate from 26 mg/l to 62 mg/l,
- c) 70 g/100 l PCL—decrease in nitrate from 26 mg/l to 20 mg/l,
- d) 105 g/100 l PCL—decrease in nitrate from 26 mg/l to 12 mg/l.

The documented influence of the nitrate concentrations were obtained even though nitrate was constantly formed over the nitrification by feeding the fish occupants (see control as comparison) and even though the water conditions remained constantly in the aerobic range.

The aerobic character of the nitrate reduction method can also be found in the sulfate reduction not observed in our studies. The sulfate content changes in the same manner in all test variations:
- a) control (0 g/100 l PCL)—113 mg/l to 146 mg/l,
- b) 35 g/100 l PCL—115 mg/l to 144 mg/l,
- c) 70 g/100 l PCL—115 mg/l to 142 mg/l,
- d) 105 g/100 l PCL—114 26 mg/l to 143 mg/l.

A further positive effect of the water treatment with PCL granulated material was ascertained during the biological activation of the nitrification.

Experiments to Decrease the Ammonia and Nitrite Concentration:

In the PCL aquariums, the highest intermediate concentrations of ammonia and nitrite were a slightly to clearly less than in the untreated control.

The positive side effect of the reduction in $NH_4^+$ and $NO_2^{2-}$ concentrations can be clearly intensified with higher PCL dosages.

If higher PCL dosages are used in the fleece bags which were also used in the nitrate reduction, existing $NH_4^+$ and $NO_2^-$ concentrations (e.g. 0.25 mMol/l) can be quickly reduced to almost 0 and the formation of increased $NH_{4+}$ and $NO_2^-$ concentrations, e.g. during the activation phase from newly set up aquariums, can be pushed back.

This is associated with a substantial improvement of the water quality for water organisms.

Dependent on the dosage, the following surprisingly good results can be obtained:
- a) 120 g/100 l PCL: 5.0-6.0 mg/l $NH_4^+$ and 9.0-10.0 mg/l $NO_2^-$ are completely eliminated within a week,
- b) 240 g/100 l PCL: 5.0 mg/l $NH_4^+$ are almost completely eliminated within 0.5 weeks, 12.0 mg/l $NO_2^-$ within 0.5-1 week.

The danger to fish feared to date when setting up new aquariums due to intermediately appearing maximum concentrations of ammonium and nitrite can be overcome by a suitable treatment with PCL.

During the first 4-6 weeks, about 100-250 g/100 l PCL, preferably 120-180 g/100 l PCL, are inserted into the filter.

Fish-endangering $NH_4^+$ and $NO_2^-$ concentrations are thereby safely avoided. In addition, excessive nitrate concentrations (e.g. 25-100 mg/l $NO_3^-$) prevailing in the initial water are also quickly reduced in this phase.

After 6 weeks, the natural nitrification has ceased. $NH_4^+$ and $NO_2^-$ concentration peaks should then also no longer be feared with reduced PCL amounts (as used for the nitrate reduction).

The PCL dosage can then be reduced to values, e.g. 50-80 g/100 l, which are sufficient for the remaining minimization of the nitrate level.

Further Effects of the Treatment of Aquarian Systems with PCL:

In addition to the agents, processes and methods according to the invention described under 3 for a reduction in the concentration or elimination of nitrate and other inorganic species ($NH_4^+/NH_3$ and $NO_2^-$), further effects were observed (chemically and biologically) which contribute to promote the water organisms and stabilize the water chemistry:

1. stabilization of the carbonate hardness and thus the pH value/range,
2. release of $CO_2$ by continuous oxidation of PCL (by $O_2$ and/or nitrate),
3. promotion of water plant growth and nitrification, and
4. low to moderate reduction of the phosphate concentration.

Areas of Application for the Agents and Processes of the Invention

Due to the very good tolerance and the very low toxicity of PCL, the following areas of application are feasible:

1. reparation of aquarian water (freshwater and salt water) in the home and professional area.
2. Preparation of garden pond water.
3. Preparation of water in aquaterriums, e.g. to hold water tortoises.
4. Rehabilitating eutrophied natural waters.
5. Preparing freshwater and salt walter in large aquariums, basins, ponds, tanks in public aquariums, zoos, in intensive fish farming, in shrimp breeding and culture.
6. Preparing N/ammonia rich waste waters from the milk, meat, food industry, brewery, agriculture (animal husbandry), leather industry and other industrial branches with comparable waste water problems.

Generally, excessive inorganic N compounds can be eliminated from all waters. The purified waters have an increased water quality and organism as well as waste water and environmental compatibility.

Summary of the Agents and Processes According to the Invention

Agents According to the Invention

Advantageously, granulated material of polycaprolactone, purity >99%, about 4 mm, are used.

However, all technologically appropriate production variations can also be used, such as e.g. injection molds which can be made of PCL, e.g.

- spheres, cylinders, cubes, rectangular parallelipipeds, inter alia smooth or with any inner and outer surface structure desired,
- extruded parts, such as e.g. rods, fibers, webs, hollow tubes and also hollow profiles,
- blow molds, such as hoses, films, etc.

Processes According to the Invention

The PCL bodies obtained are used in the water of aquarian systems and other water systems according to the dosage particulars defined in the description to reduce the nitrate, ammonia and nitrite concentration.

Mixing with Gravel or Bottom in General

PCL granulated material, molded bodies in the dosage 20 g/100 l to 200 g/100 l water, preferably 60 g/100 l to 120 g/100 l water, are mixed in the gravel having a particle size of 2-6 mm in order to lower and stabilize the nitrate content to low or lower concentrations.

Use in Filtering Systems

PCL granulated material, molded bodies are used in the main stream of filters (flow 30-1000 l/h, preferably 50-500 l/h) in filter chambers, fleece bags, gauze bags or other water-permeable containers:
  a) To reduce the nitrate content:
     20 g/100 l to 200 g/100 l water, preferably 60 g/100 l to 120/100 l water.
  b) To reduce the ammonia, nitrite (and nitrate) content:
     50 g/100 l to 500 g/100 l water, preferably 100 g/l to 250 g/100 l water.

The uses of PCL granulated material described above mixed with the bottom layer and in aerobic filter systems require a certain maintenance expenditure and comprise a partially undesirable manipulation with first use or subsequent dosing:
  a) The PCL is gradually degraded by oxidative microbiological processes over a period of 6-12 months. The reduction of the nitrate degradation efficiency resulting therefrom requires a subsequent dosing which is, in part, inconvenient to handle.
  b) In particular the subsequent dosing into the bottom layer is not easily accomplished in an established aquarium.
  c) To maintain or correct the nitrate degradation efficiency, the nitrate content of the water should be measured at specific intervals, e.g. once a month, to maintain or increase the desired nitrate reduction by a subsequent dosing in the event that the nitrate concentration increases again.

These handling disadvantages may be avoided by the alternative agents and processes described in the following.

Figure 4:
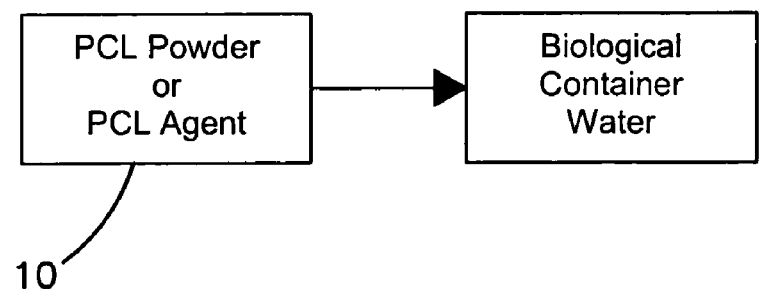
FIG. 4 is a diagrammatic representation of still another embodiment of the invention in accordance with the principles disclosed.

Use of PCL Powder as Nitrate Reducing Water Additive:

If one uses the substantially more reactive PCL powder instead of the PCL granulated material and simply adds the powder to the container water (FIG. 4) in periodic dosages, then it is surprisingly found that this treatment results in a reliable, dosage-dependent and permanent nitrate reduction.

In this case, the weekly dosing of PCL powder is fully sufficient.

The PCL powder which is added to the container water, insoluble in water and merely suspended, is partially absorbed by the filtering system and reaches between the bottom particles (sand, gravel) in part to there activate the nitrate reduction under largely aerobic conditions, the results of which are described in the following.

Introducing Various Dosages of PCL Powder Into the Container Water.

The following amounts of PCL powder are added once a week to aquariums with current container conditions and average plant and fish population and easily mixed with the water:
  a) 0 mg/l PCL powder (control)
  b) 5 mg/l PCL powder
  c) 10 mg/l PCL powder
  d) 20 mg/l PCL powder The following dosage-dependent nitrate concentrations were ascertained over a test period of 24 weeks:
  a) (Control) Constant nitrate increase from 23 mg/l to 232 mg/l.
  b) (5 mg/l) Nitrate increase from 22 mg/l to 74-76 mg/l after 12 weeks, then no further increase in nitrate up to 24 weeks.
  c) (10 mg/l) Nitrate increase from 22 mg/l to 43 mg/l after 24 weeks. An intermediate maximum of 54 mg/l was attained after 6 weeks, followed by a decrease of the nitrate content to 43 mg/l.
  d) (20 mg/l) The nitrate content decreased over a maximum of 38 mg/l after 4 weeks to 6 mg/l after 24 weeks.

It was concluded from the experiment that a dosage of 10 mg/l PCL powder per liter of water which is appropriate in practice is sufficient to prevent the nitrate content from increasing to more than 40-50 mg/l over long periods.

Significant advantages of the new process according to the invention are the simple handling (simple dosage of the recommended amount, once per week) and the maintenance and control-free nitrate reduction over any long periods.

By varying the dosage, the desired, sustained stable nitrate level can be adapted, e.g. also to the population density with fish.

Dosage of 10 mg/l PCL Powder in Various Water Conditions:

The weekly dosage of 10 mg/l PCL powder deemed appropriate in practice was subjected to a long-term test under various container conditions. The carbonate hardness (KH) of the water was varied.

The following experiment was performed at KH 2° dH and KH 11° dH (Length of experiment—20 weeks)

Once per week, 10 mg/l PCL powder was added to the experimental aquariums with current container conditions and average plant and fish population which differed only in the water chemistry (KH) and lightly mixed with the container water. The following nitrate concentrations were measured over the test period of 20 weeks:
  a) Soft, mineral-lacking water (carbonate hardness: about 2° dH)
     Control (without dosage of PCL powder): continuous nitrate increase from 2.5 mg/l to 150 mg/l after 20 weeks.
     With the same PCL dosage of 10 mg/l, the tested PCL variants only differed in the concentration of carbonate hardness additive which has no affect on the nitrate degradation.
     Variant A (10 mg/l PCL powder): from 2.5 mg/l over a maximum of 25 mg/l after 6 weeks, the nitrate content fell to 10.5 mg/l after 20 weeks.
     Variant B (10 mg/l PCL powder): from 2.4 mg/l over a maximum of 26 mg/l after 8 weeks, the nitrate concentration dropped again to 14.3 mg/l.
  b) Medium-hard tap water (carbonate hardness: about 11° dH):
     Control (without dosage of PCL powder): The nitrate concentration increased continuously from 25.5 mg/l to 170 mg/l after 20 weeks.
     Variant A (10 mg/l PCL powder): from 25.4 mg/l $NO_3^-$, the nitrate content increased to a maximum of 30 mg/l after 3 weeks and then dropped continuously to 14.3 mg/l after 20 weeks.
     Variant B (10 mg/l PCL powder): from 25.4 mg/l $NO_3^-$, the nitrate content increased to 32 mg/l after 3 weeks and then dropped to 12.4 mg/l after 20 weeks.

Use According to the Invention, Types of Application:

The use of PCL powder for nitrate reduction in container water can take place in various application forms:
  a) Pure PCL powder in dry form. A measuring spoon may be used for dosing and measuring.

b) Aqueous suspension of PCL powder in defined composition. According to the prior art, known suspension stabilizers are added to the suspension, e.g. a thickening hydrocolloid. Example: Xanthan in a suitable amount. The amount of suspended PCL powder in the product is determined from the product dosage, e.g. in a milliliter of product suspension per 4-liter container water and the desired dosage of PCL powder.

A typical example is an aqueous, stabilized suspension containing 40 g PCL powder per liter. To obtain a weekly dosage of 10 mg/l PCL powder in the container water, 1 ml of the suspension must be added per 4 l water.

c) Aqueous suspension of PCL powder in defined composition to which further functional additives are added. It was shown to be especially advantageous if PCL powder and a suspension stabilizer were added to a multifunctional liquid product, as described in WO 01/21533.

In addition to sodium citrate, citric acid, ferric citrate, citrate complexes of tracer elements and B vitamins, saccharose, 40 g/l PCL powder were added to the product solution. The addition of PCL powder significantly improves the nitrate-reducing effect of the multifunctional product described in WO 01/21533 and as a result also improves the attainable water quality to a previously unknown degree and completes the effective spectrum with a very good nitrate degradation. This improves the product considerably and makes it possible to omit changing the water in the aquarium over long periods (also more than 6 months).

Summary of the Process Based on PCL Powder:

1 mg/l to 100 mg/l, preferably 5 mg/l to 20 mg/l of PCL powder are added to the container water periodically, e.g. daily, every 2 or 3 days, weekly, every 2 weeks, monthly, preferably weekly.

The agent of the invention can be PCL powder itself and/or comprise all feasible, PCL powder containing preparations which are functionally and technologically appropriate and feasible, e.g.

aqueous suspensions,
suspensions in other functional liquid products, e.g. such as described in WO 01/21533,
pasty preparations, etc.

The preparations may contain any additives desired, e.g. suspension stabilizers, thickeners, colorants and odorous substances and also substances according to the prior art.

As already described for the use of PCL granulated material, the addition, insertion of PCL in container systems can also produce the reduction of ammonia and nitrite, in addition to the reduction of nitrate.

When using PCL powder, corresponding concentration reductions of ammonia and nitrite are also observed with comparable effectiveness.

In this case, increased dosages of PCL powder, e.g. 10-100 mg/l weekly, preferably 20-80 mg/l weekly, are shown to be especially advantageous.

Use of Further PCL Application Forms Having a Large Surface:

The use described above for reducing nitrate with the extremes, PCL granulated material having a relatively small surface, on the one hand, and PCL powder with an extremely large surface, on the other hand, makes it clear that all feasible application forms of PCL, the surface of which is similarly large as for PCL powder or lies between powder and granulated material, are also suitable for use in container systems to obtain similar, comparable effects.

In addition to the application forms already described in the first application or technologically appropriate production variations, PCL may be used in other variants, especially with a large surface, in container systems to reduce the concentrations of nitrate and also ammonia and nitrite, e.g.

as fleece, fiber webs,
as foam of various pore sizes, e.g. ppi 5 to ppi 50, the PCL foam being produced according to conventional methods according to the prior art,
as PCL coating of materials having a large surface, i.e. as applied PCL layer on mineral, organic-natural, organic-synthetic materials,
as PCL coating of porous materials (organic, inorganic) by placing thin PCL layers onto and into these materials, as fine foil leaf,
as thin PCL coatings on any unnatural, non-living decorative articles in aquariums, e.g. on stones, roots, figures,
as thin PCL coatings on plastic plants, filter wadding.

Thin PCL coatings can, for example, be produced by dipping, immersing the materials in liquid PCL (FP≈60° C.!). After cooling, the immersed materials harden the PCL film to form a thin, solid coating.

The dosage of PCL in the described application forms having a large surface is 1 g to 200 g per 100 l water, preferably 10 g to 100 g per 100 l water, in the container systems, e.g. aquariums.

The invention claimed is:

1. A method of reducing or removing inorganic nitrogen compounds from or in biological container waters comprising applying to said waters polycaprolactone under aerobic conditions.

2. The method of claim 1, wherein the inorganic nitrogen compound is a nitrate.

3. The method of claim 1, wherein the polycaprolactone is worked into a bottom layer of material of a container.

4. The method of claim 3, wherein the polycaprolactone is a granulated material.

5. The method of claim 3, wherein the amount of polycaprolactone is from 20 g to 200 g per 100 liters of container water.

6. The method of claim 3, wherein the bottom layer is gravel having a particle size of about 1 to 8 mm.

7. The method of claim 1, wherein the polycaprolactone is in powder form or a suspension of a powder.

8. The method of claim 7, wherein the polycaprolactone powder is added to the container water in the form of a paste.

9. The method of claim 7, wherein the polycaprolactone powder is added to the container water in an amount of from 5 to 20 mg/liter.

10. The method of claim 1, wherein the polycaprolactone is worked into coated large surfaces.

11. A filtering agent for container water fillers for reducing nitrogen compounds under aerobic conditions comprising polycaprolactone and a homogeneous filtering material, wherein the filtering material is gravel having a particle size of 2 to 5 mm.

* * * * *